US010831328B2

(12) United States Patent
Han et al.

(10) Patent No.: US 10,831,328 B2
(45) **Date of Patent: *Nov. 10, 2020**

(54) POLYMER FOAM ADHESIVE TAPE AND PRESSURE-SENSITIVE TYPE TOUCH PANEL COMPRISING THE SAME

(71) Applicant: LG Chem, Ltd., Seoul (KR)

(72) Inventors: Woo Joo Han, Daejeon (KR); Min Kyeong Pyo, Daejeon (KR); Hong Jun Choi, Daejeon (KR); Jang Soon Kim, Daejeon (KR); Kyung Jun Yoon, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/344,901

(22) PCT Filed: Oct. 27, 2017

(86) PCT No.: PCT/KR2017/011998
§ 371 (c)(1),
(2) Date: Apr. 25, 2019

(87) PCT Pub. No.: WO2018/080232
PCT Pub. Date: May 3, 2018

(65) Prior Publication Data

US 2019/0258342 A1 Aug. 22, 2019

(30) Foreign Application Priority Data

Oct. 27, 2016 (KR) ........................ 10-2016-0141422

(51) Int. Cl.
*G06F 3/044* (2006.01)
*C08L 75/04* (2006.01)
(Continued)

(52) U.S. Cl.
CPC ......... *G06F 3/044* (2013.01); *C08G 18/4804* (2013.01); *C08G 18/667* (2013.01);
(Continued)

(58) Field of Classification Search
CPC combination set(s) only.
See application file for complete search history.

(56) References Cited

U.S. PATENT DOCUMENTS

2001/0019764 A1* 9/2001 Bries ..................... A47G 1/175 428/317.3
2011/0006787 A1 1/2011 Kadono
(Continued)

FOREIGN PATENT DOCUMENTS

CN 105102564 A 11/2015
JP H8143833 A 6/1996
(Continued)

OTHER PUBLICATIONS

Search report from International Application No. PCT/KR2017/011998, dated Feb. 22, 2018.
(Continued)

*Primary Examiner* — Deeprose Subedi
(74) *Attorney, Agent, or Firm* — Lerner, David, Littenberg, Krumholz & Mentlik, LLP

(57) ABSTRACT

A polymer foam adhesive tape including: a substrate film; a polymer foam layer provided on one surface of the substrate film; a first adhesive layer provided on the polymer foam layer; and a second adhesive layer provided on the other surface of the substrate film, in which the polymer foam adhesive tape has a dielectric constant of 2.5 to 4.5 at a frequency of $10^5$ Hz.

17 Claims, 1 Drawing Sheet

300
200
100
400

(51) Int. Cl.
*C08G 18/66* (2006.01)
*G06F 3/041* (2006.01)
*C08G 18/48* (2006.01)
*C08G 101/00* (2006.01)

(52) U.S. Cl.
CPC .............. *C08L 75/04* (2013.01); *G06F 3/041* (2013.01); *C08G 2101/0066* (2013.01); *C09J 2201/128* (2013.01); *C09J 2203/30* (2013.01)

(56) References Cited

U.S. PATENT DOCUMENTS

| | | | | |
|---|---|---|---|---|
| 2012/0037410 | A1* | 2/2012 | Amou | B32B 7/12 174/258 |
| 2012/0094037 | A1 | 4/2012 | Banba et al. | |
| 2015/0118481 | A1 | 4/2015 | Kodama et al. | |
| 2015/0225614 | A1* | 8/2015 | Kim | B32B 37/1284 428/317.3 |
| 2015/0315424 | A1 | 11/2015 | Lee et al. | |
| 2016/0152868 | A1 | 6/2016 | Yoon et al. | |
| 2016/0231098 | A1 | 8/2016 | Otaka et al. | |
| 2016/0326407 | A1* | 11/2016 | Iwasaki | C09J 7/26 |
| 2017/0130100 | A1 | 5/2017 | Lee | |

FOREIGN PATENT DOCUMENTS

| | | | |
|---|---|---|---|
| JP | H101645 | A | 1/1998 |
| JP | 2004253764 | A | 9/2004 |
| JP | 201013648 | A | 1/2010 |
| JP | 2011017626 | A | 1/2011 |
| JP | 2016008289 | A | 1/2016 |
| JP | 2016516858 | A | 6/2016 |
| JP | 2016183292 | A | 10/2016 |
| KR | 20080056931 | A | 6/2008 |
| KR | 100964618 | B1 | 6/2010 |
| KR | 20130092112 | A | 8/2013 |
| KR | 20140069680 | A | 6/2014 |
| KR | 20140075193 | A | 6/2014 |
| KR | 20140121173 | A | 10/2014 |
| KR | 20140136353 | A | 11/2014 |
| KR | 101471361 | B1 | 12/2014 |
| KR | 20150029611 | A | 3/2015 |
| KR | 20150140761 | A | 12/2015 |
| TW | 201006904 | A | 2/2010 |
| TW | 201612275 | A | 4/2016 |
| WO | 2010147047 | A1 | 12/2010 |
| WO | 2013118933 | A1 | 8/2013 |
| WO | 2014163299 | A1 | 10/2014 |
| WO | 2015029955 | A1 | 3/2015 |
| WO | 2016125976 | A1 | 8/2016 |

OTHER PUBLICATIONS

Search report from Office Action dated Sep. 9, 2018 from TW Application No. 20170137001.
Search report from International Application No. PCT/KR2017/012000, dated Feb. 2, 2018.
Search report from Office Action dated May 24, 2018 from TW Application No. 20170137081.
Search report from International Application No. PCT/KR2017/011996, dated Feb. 2, 2018.
Search report from Office Action dated Jul. 9, 2019, from TW Application No. 201706137071.

* cited by examiner

[Figure 1]
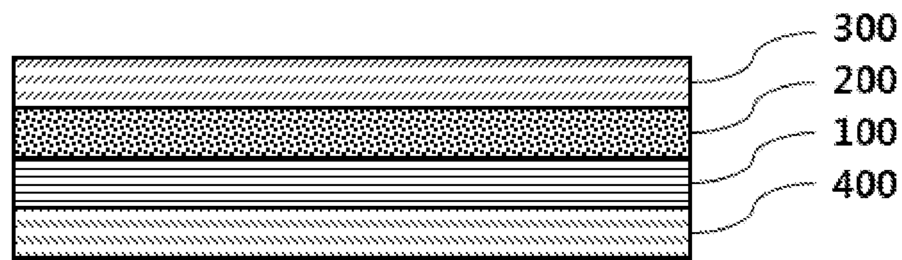
[Figure 2]
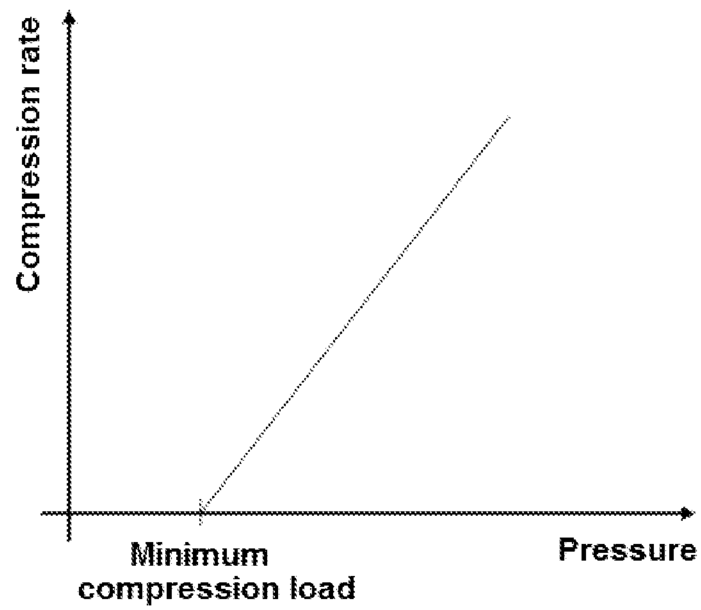

POLYMER FOAM ADHESIVE TAPE AND PRESSURE-SENSITIVE TYPE TOUCH PANEL COMPRISING THE SAME

CROSS-REFERENCE TO RELATED APPLICATIONS

This application is a national phase entry under 35 U.S.C. § 371 of International Application No. PCT/KR2017/011998, filed Oct. 27, 2017, which claims priority to Korean Patent Application No. 10-2016-0141422, filed Oct. 27, 2016, the disclosures of which are incorporated herein by reference.

TECHNICAL FIELD

The present invention relates to a polymer foam adhesive tape and a pressure-sensitive type touch panel including the same.

BACKGROUND ART

A foam adhesive tape has been widely used for bonding between parts of an electronic product and for adhering an interior product to a kitchen furniture sink table, furniture, or the like for interior design, or adhering automobile interior and exterior materials. When the foam adhesive tape is applied to electronic products, the foam adhesive tape has been used as a resilient material for protecting parts in various electronic products from an impact or as a bonding material for bonding between parts.

Various electric and electronic devices require an input device in order to carry out a necessary operation and input a predetermined content. As the input device, a touch-type input device, which is operated such that the predetermined content is input when a finger or the like touches or applies pressure onto the touch-type input device, has been developed instead of a conventional dome switch method, and examples of the touch-type input device include an electrostatic capacitance method, a resistance film method, an infrared ray method, an ultrasonic wave method, and the like according to the operation principle thereof.

A pressure-based electrostatic capacitance-type input device is an input device which has a structure (for example, a matrix arrangement) in which two electrodes spaced apart from each other at a predetermined distance are arranged with an elastic body therebetween, and produces input signals corresponding to a position at which pressure is applied and a magnitude of the applied pressure by measuring a change in electrostatic capacitance, which occurs while the distance between the two upper and lower electrodes is changed by the applied pressure, to detect the position at which the pressure is applied and the magnitude of the applied pressure, and is characterized in that inputs may be performed by applying pressure with any object which need not be a conductor, and different input signals may be produced according to not only a touch position but also a magnitude of applied pressure.

However, an existing pressure-sensitive type touch panel as a pressure-based electrostatic capacitance-type input device uses a method of utilizing elasticity of a housing having an empty space such as a lattice structure therein and thus has a problem in that the existing pressure-sensitive type touch panel becomes complicated in structure, or cannot be applied at a predetermined thickness or less.

REFERENCES OF THE RELATED ART

Patent Documents

KR 10-2014-0136353 A
KR 10-2008-0056931 A

DETAILED DESCRIPTION OF THE INVENTION

Technical Problem

The present invention relates to a polymer foam tape and a pressure-sensitive type touch panel including the same. More particularly, the present invention relates to a polymer foam tape which is applied to a touch part of the pressure-sensitive type touch panel and thus enables a detection of a difference between pressures input by the touch part.

Technical Solution

An exemplary embodiment of the present invention provides a polymer foam adhesive tape including: a substrate film; a polymer foam layer provided on one surface of the substrate film; a first adhesive layer provided on the polymer foam layer; and a second adhesive layer provided on the other surface of the substrate film, in which the polymer foam adhesive tape has a dielectric constant of 2.5 to 4.5 at a frequency of $10^5$ Hz.

Another exemplary embodiment of the present invention provides a pressure-sensitive type touch panel including the polymer foam adhesive tape.

Advantageous Effects

A polymer foam adhesive tape according to an exemplary embodiment of the present invention may implement an excellent compression recovery rate and an excellent compression recovery speed.

The polymer foam adhesive tape according to the exemplary embodiment of the present invention has advantages in that the polymer foam adhesive tape is compressed at a predetermined rate, and is also recovered at a predetermined rate even during the compression recovery.

The polymer foam adhesive tape according to the exemplary embodiment of the present invention has an advantage in that the maximum compression rate and compression recovery rate do not significantly deteriorate even though the compression and compression recovery are repeated.

The polymer foam adhesive tape according to the exemplary embodiment of the present invention may enable a detection of a difference between pressures input by a touch part when applied to a pressure-sensitive type portable touch panel.

BRIEF DESCRIPTION OF DRAWINGS

FIG. 1 illustrates a stacking sequence in a polymer foam adhesive tape according to an exemplary embodiment of the present invention.

FIG. 2 illustrates a compression rate of the polymer foam adhesive tape according to the exemplary embodiment of the present invention.

MODE FOR INVENTION

When one member is disposed "on" another member in the present specification, this includes not only a case where the one member is brought into contact with another member, but also a case where still another member is present between the two members.

When one part "includes" one constituent element in the present specification, unless otherwise specifically described, this does not mean that another constituent element is excluded, but means that another constituent element may be further included.

Further, the same or similar reference numeral is assigned to the same or corresponding constituent element, regardless of reference numerals, and a repeated description thereof will be omitted, and a size and a shape of each illustrated constituent member may be exaggerated or decreased for convenience of explanation.

In the present specification, the thickness may be a value measured by collecting a sample with a size of 50 mm×50 mm, measuring 9 points at the left center right/upper center lower parts by a non-contact type method using laser, and taking an average value thereof.

The present inventors have conducted a continuous study for simplifying a structure of a touch part of a pressure-sensitive type touch panel, and simultaneously, for providing a predetermined compressibility according to the intensity of pressure applied to the touch part, thereby preparing a polymer foam adhesive tape which may be applied to the touch part of the pressure-sensitive type touch panel. Specifically, a polymer foam tape according to the present invention has a predetermined compression displacement and thus has advantages in that it is possible to help to detect a differentiated signal according to the intensity of compression of a touch signal, and to increase touch sensitivity of a pressure-sensitive type touch panel due to an excellent compression recovery rate and an excellent compression recovery speed.

Further, a polymer foam adhesive tape according to an exemplary embodiment has a dielectric constant within an appropriate range and thus has an advantage in that it is possible to produce a clean signal which has a suitable intensity but has no noise, in detecting electrostatic signals according to a compression rate and imparting a function according to the signals.

Hereinafter, the present specification will be described in more detail.

An exemplary embodiment of the present invention provides a polymer foam adhesive tape including: a substrate film; a polymer foam layer provided on one surface of the substrate film; a first adhesive layer provided on the polymer foam layer; and a second adhesive layer provided on the other surface of the substrate film, in which the polymer foam adhesive tape has a dielectric constant of 2.5 to 4.5 at a frequency of $10^5$ Hz.

According to an exemplary embodiment of the present invention, the polymer foam adhesive tape may have a dielectric constant of 2.5 to 4.5 at a frequency of $10^5$ Hz. Specifically, the polymer foam adhesive tape may have a dielectric constant of 2.5 to 4.0 or 2.5 to 3.5 at a frequency of $10^5$ Hz.

A polymer foam adhesive tape having a dielectric constant of less than 2.5 may incur a problem in that it is difficult to distinguish a change in intensity of a signal according to a compression rate because it is possible to only detect a change in electrostatic capacitance signal having too low an intensity according to the compression rate. In contrast, when the polymer foam adhesive tape has too high a dielectric constant, much noise is included in a change in electrostatic signal according to a compression rate, and accordingly, it may be difficult to detect a change in intensity of a signal. Accordingly, the dielectric constant of the polymer foam adhesive tape according to the exemplary embodiment of the present invention is adjusted to 2.5 to 4.5 at a frequency of $10^5$ Hz, such that the change in intensity of an electrostatic capacitance signal according to the compression rate is clear and may be detected without noise, thereby optimizing the performance of the polymer foam adhesive tape.

In the present specification, a measurement method of the dielectric constant is as follows. A required quantity of measurement samples with a size of 50 mm×25 mm are collected, and by using Agilent E4980A which is an apparatus for measuring the dielectric constant, the initial setting and the zero point adjustment of the apparatus are performed according to the program. Furthermore, a prepared sample is closely adhered to the bottom surface of the measurement apparatus, the tip at the upper portion of the measurement apparatus is slowly lowered to set the tip so as to be suitable for a 50% thickness (85 μm) by compression, measurement is performed three times, and then an average value is taken.

FIG. 1 illustrates a stacking sequence in the polymer foam adhesive tape according to the exemplary embodiment of the present invention. Specifically, FIG. 1 illustrates a polymer foam adhesive tape in which a first adhesive layer 300 and a second adhesive layer 400 are provided, respectively, on upper surface and lower surfaces of a structural body in which a polymer foam layer 200 is formed on a substrate film 100. That is, FIG. 1 illustrates the polymer foam adhesive tape in which the second adhesive layer 400, the substrate film 100, the polymer foam layer 200, and the first adhesive layer 300 are sequentially stacked.

According to an exemplary embodiment of the present invention, the substrate film may be a polymer film. Specifically, the substrate film may be a polymer film prepared from a material selected from the group consisting of polypropylene, polyethylene, polyvinyl chloride, polyethylene terephthalate, polyethylene naphthalate, polycarbonate, polymethyl(meth)acrylate, cellulose acetate, cellulose triacetate, and ethyl cellulose. However, the substrate film is not limited to the examples.

According to an exemplary embodiment of the present invention, the substrate film may include a primer layer for improving the attaching strength to the polymer foam adhesive tape and the reliability on one surface of the substrate film, if necessary.

Further, according to an exemplary embodiment of the present invention, as the substrate film, it is possible to use a substrate film which is not separately processed, and further, it is possible to use a film of which the shrinkage caused by heat or moisture is prevented through a post-processing such as a heat treatment, if necessary.

According to an exemplary embodiment of the present invention, a thickness ratio of the substrate film to the polymer foam layer may be 1:3 to 1:10.

As the ratio of the thickness of the polymer foam layer to the total thickness of the polymer foam adhesive tape is increased, the minimum compression load may be reduced, and the high compression rate may be obtained. However, in terms of a recovery speed, as the thickness ratio of the polymer foam layer is increased, the recovery speed may be reduced. Further, as the ratio of the thickness of the substrate film to the total thickness of the polymer foam adhesive tape is increased, the recovery speed may be increased, and the compression rate according to pressure may have linearity. However, as the thickness ratio of the substrate film is increased, the minimum compression load and the maximum compression rate may be reduced. In addition, as the ratio of the thickness of the substrate film to the total thickness of the polymer foam adhesive tape is increased, recovery characteristics may be excellent with respect to long-term compression and repeated compression or long-term compression and repeated compression under environmental conditions such as high temperature and high humidity.

The polymer foam adhesive tape may simultaneously implement a high compression rate and a fast recovery speed, and long-term durability by adjusting the thickness ratio of the substrate film to the polymer foam layer within the range.

According to an exemplary embodiment of the present invention, when the substrate film and the polymer foam layer have a total thickness of 100 μm or more and less than 150 μm, a thickness ratio of the substrate film to the polymer foam layer may be 1:3 to 1:10, specifically, 1:4 to 1:6, or 1:5.

According to an exemplary embodiment of the present invention, when the substrate film and the polymer foam layer have a total thickness of 150 μm or more and less than 1,000 μm, a thickness ratio of the substrate film to the polymer foam layer may be 1:4 to 1:10, specifically, 1:7 to 1:10.

According to an exemplary embodiment of the present invention, the substrate film may have a thickness of 10 μm to 250 μm. Specifically, the substrate film may have a thickness of 10 μm to 200 μm, 10 μm to 150 μm, 10 μm to 100 μm, or 10 μm to 75 μm. However, the thickness of the substrate film may vary depending on the total thickness of the polymer foam adhesive tape.

As the thickness of the substrate film is decreased, the minimum compression load of the polymer foam adhesive tape may be reduced, and the high compression rate may be obtained. However, as the thickness of the substrate film is decreased, the recovery speed of the polymer foam adhesive tape may be reduced. On the contrary, as the thickness of the substrate film is increased, the recovery speed of the polymer foam adhesive tape may be increased, and the compression rate according to pressure may have linearity. However, as the thickness of the substrate film is increased, the minimum compression load and the maximum compression rate of the polymer foam adhesive tape may be decreased.

Physical properties of the polymer foam adhesive tape are significantly affected by not only the thickness of the substrate film, but also the thickness ratio of the substrate film to the polymer foam layer. Therefore, when the thickness ratio of the substrate film to the polymer foam layer is 1:3 to 1:10, and the thickness of the substrate film is within the range, physical properties such as a minimum compression load and an excellent recovery speed may be satisfied.

According to an exemplary embodiment of the present invention, when the substrate film and the polymer foam layer have a total thickness of 200 μm or less, the substrate film may have a thickness of 10 μm to 40 μm, 10 μm to 30 μm, or 15 μm to 30 μm, or 20 μm to 30 μm.

According to an exemplary embodiment of the present invention, when the substrate film and the polymer foam layer have a total thickness of more than 200 μm, the substrate film may have a thickness of 30 μm to 100 μm, 30 μm to 80 μm, or 30 μm to 75 μm, or 35 μm to 50 μm.

According to an exemplary embodiment of the present invention, the polymer foam layer may be selected from the group consisting of a urethane-based foam layer, a silicone-based foam layer, an acrylic foam layer, and a polyolefin-based foam layer.

According to an exemplary embodiment of the present invention, the polymer foam layer may be a urethane-based foam layer. As the urethane-based foam layer, a urethane-based foam layer having a density of 0.3 g/cm$^3$ or less may be used, and a preparation method thereof may be a preparation method using a method known in the art.

According to an exemplary embodiment of the present invention, the urethane-based foam layer may be formed by reacting a urethane composition including 60 parts by weight to 140 parts by weight of an isocyanate-based curing agent, 0.1 part by weight to 10 parts by weight of a plasticizer, and 0.1 part by weight to 10 parts by weight of a foaming agent, based on 100 parts by weight of polyol. However, the urethane composition is not limited thereto, and may further include an additive such as a chain extender and a catalyst.

Specifically, according to an exemplary embodiment of the present invention, the urethane composition may include a polyol including a polyether and/or a polyester, which have/has a weight average molecular weight of 1,000 to 4,000.

The urethane foam layer may be formed by subjecting the urethane composition to a coating process, a foaming process, a curing process, and the like. As the coating process, methods such as comma coating, slot die coating, or roll-to-roll coating may be used. As the foaming process, it is possible to use a pore forming method by incorporation of a gas or a heat foaming method using a heat foaming agent. As the curing process, it is possible to use a curing method by heat, a method using a heat drum, an IR heating method, a method by hot wind, or the like. However, the method is not limited thereto, and it is possible to use a publicly-known process for forming urethane foam.

According to an exemplary embodiment of the present invention, the polymer foam layer may be an acrylic foam layer. As the acrylic foam layer, an acrylic foam layer having a density of 0.3 g/cm$^3$ or less may be used, and a preparation method thereof may be a preparation method using a method known in the art.

According to an exemplary embodiment of the present invention, an acrylic resin network constituting the acrylic foam layer may include a cured product of an acrylic composition including: a (meth)acrylate monomer; and a polar functional group-containing monomer.

According to an exemplary embodiment of the present invention, the (meth)acrylate monomer may be a (meth)acrylate having an alkyl group having 1 to 20 carbon atoms. Specifically, the (meth)acrylate monomer may include one or more selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, and isooctyl (meth)acrylate.

According to an exemplary embodiment of the present invention, the polar functional group-containing monomer may include one or more selected from the group consisting of a hydroxy group-containing monomer, a carboxy group-containing monomer, and a nitrogen-containing monomer.

According to an exemplary embodiment of the present invention, the hydroxy group-containing monomer may be one or more selected from the group consisting of 2-hydroxyethyl (meth)acrylate, 2-hydroxypropyl (meth)acrylate, 4-hydroxybutyl (meth)acrylate, 6-hydroxyhexyl (meth)

acrylate, 8-hydroxyoctyl (meth)acrylate, 2-hydroxyethyleneglycol (meth)acrylate, and 2-hydroxypropyleneglycol (meth)acrylate.

According to an exemplary embodiment of the present invention, the carboxy group-containing monomer may be one or more selected from the group consisting of acrylic acid, methacrylic acid, 2-(meth)acryloyloxy acetic acid, 3-(meth)acryloyloxy propyl acid, 4-(meth)acryloyloxy butyl acid, an acrylic acid dimer, itaconic acid, and maleic acid.

According to an exemplary embodiment of the present invention, the nitrogen-containing monomer may be one or more selected from the group consisting of 2-isocyanatoethyl (meth)acrylate, 3-isocyanatopropyl (meth)acrylate, 4-isocyanatobutyl (meth)acrylate, (meth)acrylamide, N-vinylpyrrolidone, and N-vinylcaprolactam.

According to an exemplary embodiment of the present invention, the acrylic resin network may be a cured product of an acrylic composition including ethylhexyl acrylate, acrylic acid, and hydroxyethyl acrylate.

According to an exemplary embodiment of the present invention, a content of the polar functional group-containing monomer may be 10 parts by weight to 35 parts by weight based on 100 parts by weight of the (meth)acrylate monomer.

According to an exemplary embodiment of the present invention, a form of the acrylic composition may be in a form in which an acrylic composition is dispersed in a solvent, and in a form of an emulsion in which an acrylic composition is included.

According to an exemplary embodiment of the present invention, the acrylic composition may further include one or more additives selected from the group consisting of a photoinitiator, a thermal initiator, a plasticizer, and a curing agent.

According to an exemplary embodiment of the present invention, the photoinitiator may include one or more selected from the group consisting of benzoin methyl ether, 2,4,6-trimethylbenzoyl diphenylphosphine oxide, bis(2,4,6-trimethylbenzoyl) phenylphosphine oxide, α,α-methoxy-α-hydroxyacetophenone, 2-benzoyl-2-(dimethylamino)-1-[4-(4-morphonyl) phenyl]-1-butanone, and 2,2-dimethoxy-2-phenylacetophenone.

According to an exemplary embodiment of the present invention, a content of the photoinitiator may be 0.01 wt % to 1 wt % with respect to the acrylic composition.

According to an exemplary embodiment of the present invention, the thermal initiator may include one or more selected from the group consisting of an azo-based compound, a peroxy-based compound, tert-butyl peracetate, peracetic acid, and potassium persulfate.

According to an exemplary embodiment of the present invention, a content of the thermal initiator may be 0.01 wt % to 1 wt % with respect to the acrylic composition.

According to an exemplary embodiment of the present invention, the plasticizer may be higher alcohols such as liquid paraffin, hydrogenated oil, hydrogenated castor oil, and octyl dodecanol; and/or fatty acid esters such as squalane, squalene, castor oil, liquid rubber (polybutene), and isopropyl myristate.

According to an exemplary embodiment of the present invention, a content of the plasticizer may be 1 wt % to 10 wt % with respect to the acrylic composition.

According to an exemplary embodiment of the present invention, the curing agent may include one or more selected from the group consisting of an aziridine-based curing agent, an amine-based curing agent, an isocyanate-based curing agent, and an epoxy-based curing agent.

According to an exemplary embodiment of the present invention, a content of the curing agent may be 0.05 wt % to 5 wt % with respect to the acrylic composition.

According to an exemplary embodiment of the present invention, the acrylic composition may include a surfactant, a thickener, and other additives.

The acrylic foam layer may be formed by subjecting the acrylic composition to a coating process, a foaming process, a curing process, and the like. As the coating process, methods such as comma coating, slot die coating, or roll-to-roll coating may be used. As the foaming process, it is possible to use a pore forming method by incorporation of a gas or a heat foaming method using a heat foaming agent. As the curing process, it is possible to use a curing method by light, a curing method by heat, a method using a heat drum, an IR heating method, a method by hot wind, or the like. However, the method is not limited thereto, and it is possible to use a publicly-known process for forming acrylic foam.

According to an exemplary embodiment of the present invention, the polymer foam layer may be a silicone-based foam layer. As the silicone-based foam layer, a silicone-based foam layer having a density of 0.3 g/cm$^3$ or less may be used, and a preparation method thereof may be a preparation method using a method known in the art.

According to an exemplary embodiment of the present invention, the polymer foam layer may be a polyolefin-based foam layer. As the polyolefin-based foam layer, a polyolefin-based foam layer having a density of 0.3 g/cm$^3$ or less may be used, and a preparation method thereof may be a preparation method using a method known in the art.

According to an exemplary embodiment of the present invention, the polymer foam layer may have a density of 0.3 g/cm$^3$ or less. Specifically, the polymer foam layer may have a density of 0.15 g/cm$^3$ to 0.3 g/cm$^3$, or 0.2 g/cm$^3$ to 0.3 g/cm$^3$.

When the density of the polymer foam layer is within the range, the polymer foam adhesive tape may implement excellent strength and an excellent compression recovery rate. Furthermore, when the density of the polymer foam layer is within the range, the polymer foam adhesive tape may implement an appropriate minimum compression load and an excellent compression rate.

According to an exemplary embodiment of the present invention, the polymer foam layer may have a thickness of 75 μm to 1,000 μm. However, the thickness of the polymer foam layer may vary depending on the total thickness of the polymer foam adhesive tape.

When the polymer foam layer has a density of 0.3 g/cm$^3$ or less and a thickness within the range, an appropriate elasticity is secured so that the compression recovery strength of the polymer foam adhesive tape may be appropriately adjusted, and when the polymer foam layer has a thickness within the range, the polymer foam layer may be stably prepared while maintaining the density of 0.3 g/cm$^3$ or less.

Physical properties of the polymer foam adhesive tape are significantly affected by not only the thickness of the polymer foam layer, but also the thickness ratio of the substrate film to the polymer foam layer. Therefore, when the thickness ratio of the substrate film to the polymer foam layer is 1:3 to 1:10, and the thickness of the polymer foam layer is within the range, physical properties such as a minimum compression load and an excellent recovery speed may be satisfied.

According to an exemplary embodiment of the present invention, when the substrate film and the polymer foam layer have a total thickness of 200 μm or less, the polymer foam layer may have a thickness of 100 μm to 190 μm, 100 μm to 170 μm, 100 μm to 150 μm, 100 μm to 130 μm, or 110 μm to 130 μm.

According to an exemplary embodiment of the present invention, when the substrate film and the polymer foam layer have a total thickness of more than 200 μm, the polymer foam layer may have a thickness of 100 μm to 1,000 μm, 100 μm to 800 μm, 100 μm to 750 μm, 100 μm to 500 μm, or 120 μm to 500 μm.

According to an exemplary embodiment of the present invention, the substrate film and the polymer foam layer may have a total thickness of 100 μm to 1,000 μm. The total thickness range of the substrate film and the polymer foam layer may be adjusted according to a product to be applied. Specifically, the substrate film and the polymer foam layer may have a total thickness of 100 μm to 200 μm, specifically, 100 μm to 150 μm, in order to be applied to a touch panel of a thin film.

According to an exemplary embodiment of the present invention, the polymer foam layer may include pores having an average diameter of 10 μm to 100 μm. Specifically, the polymer foam layer may include pores having an average diameter of 20 μm to 80 μm, or 20 μm to 50 μm.

When the average diameter of the pores is within the range, the polymer foam adhesive tape may implement an excellent minimum compression load and a high compression rate, and may implement an excellent strength and a fast compression recovery time. Further, the average diameter of the pores in the polymer foam layer may be appropriately adjusted within the range according to the thickness of the polymer foam layer.

In the present specification, for the average diameter of the pores, the largest diameters of 30 to 50 pores are measured by taking a photograph of a cross-sectional sample of a polymer foam layer by means of a scanning electron microscope (SEM), and the average value thereof may be obtained as an average particle diameter.

According to an exemplary embodiment of the present invention, the polymer foam adhesive tape may have a maximum compression rate of 30% to 70%. Specifically, the polymer foam adhesive tape may have a maximum compression rate of 40% to 65%.

When the maximum compression rate of the polymer foam adhesive tape is within the range, there are advantages in that when the polymer foam adhesive tape is applied to a touch panel, and the like, the polymer foam adhesive tape may not undergo a severe deformation caused by pressure, and may receive signals within a wide range.

According to an exemplary embodiment of the present invention, the polymer foam adhesive tape may have a compression recovery rate of 90% to 95%, specifically, 98% or 99% or more.

The compression recovery rate may mean a degree to which, when pressure is removed from the polymer foam adhesive tape, the thickness of the polymer foam adhesive tape is recovered to a thickness of the polymer foam adhesive tape before the pressure is applied thereto. Specifically, a compression recovery rate of 100% means that after pressure is removed from the polymer foam adhesive tape, the thickness of the polymer foam adhesive tape is recovered to 100% of the thickness of the polymer foam adhesive tape before the pressure is applied thereto.

According to an exemplary embodiment of the present invention, the compression recovery rate of the polymer foam adhesive tape may be 90% or more, and a compression recovery time to reach 90% of the thickness before compression may be within 0.1 second.

According to an exemplary embodiment of the present invention, a final compression recovery rate of the polymer foam adhesive tape may be 99% or more, and a compression recovery time to reach 99% of the thickness before compression may be within 1.0 second.

In order to measure the compression recovery rate and the compression recovery time, it is possible to use a method of attaching both surfaces of a polymer foam adhesive tape onto a flat glass substrate and then applying a predetermined pressure at 10 g to 1 kg at a speed of 10 mm/min by using a flat tip having a diameter of 10 mm. At this time, a compression rate is measured from the instant when the tip touches the substrate, and the compression rate may be calculated by measuring a distance pressed down by a load at the maximum pressure load. A compression recovery speed is measured by using a load applied to a tip returning at a predetermined speed, and when a speed at which a polymer foam adhesive tape is recovered is slower than a speed at which a tip returns, a load is not applied, so that the recovery speed is measured based on the foregoing fact.

In addition, the compression recovery rate may be confirmed by measuring a thickness before compression is applied and a thickness recovered after compression is released by means of a thickness measuring apparatus.

Furthermore, a compression rate when compression is not obtained any more may be measured as a maximum compression rate by using the method.

The polymer foam adhesive tape according to the present invention has a high compression recovery rate, and has a very short compression recovery time, and as a result, there is an advantage in that when applied to a touch part of a pressure-sensitive type touch panel, the polymer foam adhesive tape may sensitively respond to the pressure continuously input.

According to an exemplary embodiment of the present invention, the polymer foam adhesive tape may have a minimum compression load of 30 g to 300 g. Specifically, the polymer foam adhesive tape may have a minimum compression load of 30 g to 250 g, 30 g to 200 g, 30 g to 150 g, 30 g to 100 g, 40 g to 250 g, 40 g to 200 g, 40 g to 150 g, 40 g to 100 g, 50 g to 250 g, 50 g to 200 g, 50 g to 150 g, or 50 g to 100 g.

When the minimum compression load of the polymer foam adhesive tape is within the range, there is an advantage in that when the polymer foam adhesive tape is applied to an apparatus such as a pressure-sensitive type touch panel, the apparatus may effectively sense signals caused by pressure without responding to a contact which is not intended by a user.

In the present specification, the minimum compression load may be measured by attaching both surfaces of a polymer foam adhesive tape onto a flat glass substrate and then applying pressure at a speed of 10 mm/min while increasing a load from 10 g to 1 kg with a flat tip having a diameter of 10 mm. At this time, the minimum compression load may be measured as a load when the polymer foam adhesive tape is compressed by 5 μm or more, in consideration of a resolution of a measuring apparatus and a resolution of an intensity of a signal caused by compression. That is, while the load is increased to 1 kg from the instant when the tip touches the glass substrate, a load when the tape is compressed by 5 μm may be measured as a minimum compression load.

According to an exemplary embodiment of the present invention, the compression rate of the polymer foam adhesive tape may be within 1% when pressure, which is less than the minimum compression load, is applied. That is, when a compression rate within 1% occurs, it may be determined that the polymer foam adhesive tape is not compressed.

The polymer foam adhesive tape according to the present invention has a minimum compression load within the range, and is not substantially compressed at pressure, which is less than the minimum compression load, and as a result, there is an advantage in that when the polymer foam adhesive tape is applied to a pressure-sensitive type touch panel, the pressure-sensitive type touch panel may not respond to unintended input pressure. However, the above-described minimum compression load may vary depending on the density of the polymer foam layer and the thicknesses of the polymer foam layer, the substrate film, and both adhesive layers.

According to an exemplary embodiment of the present invention, the compression rate of the polymer foam adhesive tape may be increased in proportion to a linear function according to an increase in pressure when pressure, which is equal to or more than the minimum compression load, is applied. The fact that the compression rate of the polymer foam adhesive tape is increased in proportion to the linear function according to the increase in pressure may mean that a slope of a graph drawn by measuring the compression rate caused by the increase in pressure is linear or close to linear.

FIG. 2 illustrates a compression rate of the polymer foam adhesive tape according to the exemplary embodiment of the present invention. Specifically, FIG. 2 illustrates an increase in compression rate in proportion to a linear function according to an increase in pressure when pressure, which is equal to or more than the minimum compression load, is applied.

According to an exemplary embodiment of the present invention, a thickness recovery rate of the polymer foam adhesive tape after pressure is removed may be increased in proportion to the linear function as time passes. Specifically, the polymer foam adhesive tape after pressure is removed may be recovered to the thickness before pressure is applied at a predetermined speed as time passes. The fact that the thickness recovery rate of the polymer foam adhesive tape after pressure is removed is increased in proportion to the linear function as time passes may mean that after pressure is removed, a slope of a graph drawn by measuring the compression rate according to the time is linear or close to linear.

Since the compression rate of the polymer foam adhesive tape according to an exemplary embodiment of the present invention is linearly increased according to the increase in pressure, there is an advantage in that when the polymer foam adhesive tape is applied to a touch part of a pressure-sensitive type touch panel, the touch part may sensitively distinguish input pressure. Furthermore, due to the characteristics as described above, the polymer foam adhesive tape also has a benefit in that it is possible to implement a 3D touch of a pressure-sensitive type touch panel.

In addition, since the compression rate of the polymer foam adhesive tape according to an exemplary embodiment of the present invention is linearly changed, each compression rate may be forecast within a predetermined pressure range, and it is possible to easily constitute the intensity of a signal according to the compression rate and a function according to the intensity. Furthermore, since the compression rate of the polymer foam adhesive tape according to an exemplary embodiment of the present invention is linearly changed, there is a benefit in that the intensity of a signal according to each compression rate may be divided into various steps, and a function may be separately imparted for each step.

When a recovery tendency of a polymer foam tape is not linear as in the case where the initial recovery speed is fast, but the terminal recovery speed becomes significantly slow, there may occur problems in that it is difficult to divide the intensity of a signal according to each compression rate into various steps, a signal interference occurs when a part is touched, and then another part is touched, and the like. In contrast, when the recovery speed shows a tendency to be linearly recovered as in an exemplary embodiment of the present invention, the polymer foam adhesive tape has a benefit in that it is possible to impart the same function as during the compression.

In the present specification, the compression rate of the polymer foam adhesive tape may be expressed as the following Equation 1.

$$\text{Compression rate (\%)}=\{(\text{thickness before pressure is applied}-\text{thickness after pressure is applied})/\text{thickness before pressure is applied}\}\times 100 \quad \text{[Equation 1]}$$

Further, in the present specification, a thickness recovery rate of a urethane foam adhesive tape may be expressed as the following Equation 2.

$$\text{Thickness recovery rate (\%)}=\{(\text{thickness before pressure is applied}-\text{thickness after pressure is removed})/(\text{thickness before pressure is applied thickness after pressure is applied})\}\times 100 \quad \text{[Equation 2]}$$

According to an exemplary embodiment of the present invention, the first adhesive layer and the second adhesive layer may be each independently an adhesive agent which uses a resin composed of an acrylic polymer, a silicone-based polymer, and a rubber-based polymer. The first adhesive layer and the second adhesive layer may be prepared by a curing method by means of heat and a curing method by means of UV irradiation.

According to an exemplary embodiment of the present invention, a polymer foam adhesive tape including the adhesive layer may have an adhesive strength of 300 g/in or more. More specifically, the polymer foam adhesive tape may have an adhesive strength of 500 g/in to 2 kg/in.

In the present specification, the adhesive strength may mean a value obtained by backing a polyethylene terephthalate (PET) film, attaching the PET film onto a SUS304 substrate by using a 2 kg-roller, peeling off the PET film at a peeling angle of 180 degrees and a speed of 300 mm/min under constant temperature and constant humidity conditions of 23° C. and 25 RH %, and making a measurement in accordance with ASTM D903.

According to an exemplary embodiment of the present invention, the first adhesive layer and the second adhesive layer may each have a thickness of 5 μm to 75 μm. Specifically, the first adhesive layer and the second adhesive layer may each have a thickness of 10 μm to 50 μm.

When the thicknesses of the first adhesive layer and the second adhesive layer are within the range, the polymer foam adhesive tape may be attached to an adherend while exhibiting an appropriate attachment strength without incurring a peeling phenomenon, and the compression rate of the polymer foam adhesive tape due to the adhesive layers may not be significantly affected.

According to an exemplary embodiment of the present invention, the polymer foam adhesive tape may be for a pressure-sensitive type touch panel. Specifically, the polymer foam adhesive tape may be for a pressure-sensitive type portable touch panel.

An exemplary embodiment of the present invention provides a pressure-sensitive type touch panel including the polymer foam adhesive tape.

According to an exemplary embodiment of the present invention, the pressure-sensitive type touch panel may be a pressure-sensitive type portable touch panel.

According to an exemplary embodiment of the present invention, the pressure-sensitive type touch panel may have a structure generally applied in the art, except that the polymer foam adhesive tape is included in a touch part.

According to an exemplary embodiment of the present invention, the polymer foam adhesive tape may be provided on a lower surface of a display part of the touch panel.

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to the person with ordinary skill in the art.

Example 1

In order to form a urethane-based foam layer, a mixture was prepared by mixing 28 parts by weight of a curing agent, 2 parts by weight of a pigment, 10 parts by weight of a filler, 2 parts by weight of a surfactant, and 0.05 part by weight of a catalyst for a curing reaction with 100 parts by weight of a polyol mixture (18 wt % of a polyether-based monomer having a weight average molecular weight of 4,000, 34 wt % of a polyether-based monomer having a weight average molecular weight of 2,000, 19 wt % of a polyester-based monomer having a weight average molecular weight of 2,000, 19 wt % of a polyester-based monomer having a weight average molecular weight of 1,000, and 10 wt % of a chain extender), the resulting mixture was stirred by using a rotor-stator type mixer, so that pores were formed, and then a urethane-based foam layer having a thickness of 125 μm and a density of 0.24 g/cm$^3$ was prepared by a curing process by means of heat.

A transparent PET film having a thickness of 25 μm was used as a substrate film, and the urethane-based foam layer prepared as described above was stacked on one surface of the substrate film.

Furthermore, a first adhesive layer formed of an acrylic adhesive layer was formed to have a thickness of 10 μm on the urethane-based foam layer, and a second adhesive layer formed of an acrylic adhesive agent was formed to have a thickness of 10 μm on the other surface of the substrate film, thereby preparing a polymer foam adhesive tape.

Example 2

In order to form a urethane-based foam layer, a mixture was prepared by mixing 25 parts by weight of a curing agent, 2 parts by weight of a pigment, 10 parts by weight of a filler, 2 parts by weight of a surfactant, and 0.05 part by weight of a catalyst for a curing reaction with 100 parts by weight of a polyol mixture (22 wt % of a polyether-based monomer having a weight average molecular weight of 4,000, 38 wt % of a polyether-based monomer having a weight average molecular weight of 2,000, 15 wt % of a polyester-based monomer having a weight average molecular weight of 2,000, 15 wt % of a polyester-based monomer having a weight average molecular weight of 1,000, and 10 wt % of a chain extender), the resulting mixture was stirred by using a rotor-stator type mixer, so that pores were formed, and then a urethane-based foam layer having a thickness of 125 μm and a density of 0.24 g/cm$^3$ was prepared by a curing process by means of heat.

A transparent PET film having a thickness of 25 μm was used as a substrate film, and the urethane-based foam layer prepared as described above was stacked on one surface of the substrate film.

Furthermore, a first adhesive layer formed of an acrylic adhesive layer was formed to have a thickness of 10 μm on the urethane-based foam layer, and a second adhesive layer formed of an acrylic adhesive agent was formed to have a thickness of 10 μm on the other surface of the substrate film, thereby preparing a polymer foam adhesive tape.

Example 3

An acrylic composition including 90 wt % of ethylhexyl acrylate and 10 wt % of acrylic acid was prepared, 0.1 part by weight of a photoinitiator (Irgacure 651, BASF), 1.5 parts by weight of a curing agent (SUO-1020, Shin-a T&C), and 2 parts by weight of a surfactant were mixed with 100 parts by weight of the acrylic composition, and then a gas was mixed with the resulting mixture by using a rotor-stator type mixer. Furthermore, the prepared acrylic composition was cured by being irradiated with a total 5.5 W/cm$^2$ of UV, thereby preparing an acrylic foam layer having a thickness of 125 μm and a density of 0.28 g/cm$^3$.

The acrylic foam layer prepared as described above was stacked on one surface of a transparent polyethylene terephthalate (PET) film having a thickness of 25 μm.

Furthermore, a first adhesive layer formed of an acrylic adhesive layer was formed to have a thickness of 10 μm on the acrylic foam layer, and a second adhesive layer formed of an acrylic adhesive agent was formed to have a thickness of 10 μm on the other surface of the substrate film, thereby preparing a polymer foam adhesive tape.

Example 4

An acrylic composition including 80 wt % of ethylhexyl acrylate, 10 wt % of acrylic acid, and 10 wt % of hydroxyethyl acrylate was prepared, 0.1 part by weight of a photoinitiator (Irgacure 651, BASF), 1.5 parts by weight of a curing agent (SUO-1020, Shin-a T&C), and 2 parts by weight of a surfactant were mixed with 100 parts by weight of the acrylic composition, and then a gas was mixed with the resulting mixture by using a rotor-stator type mixer. Furthermore, the prepared acrylic composition was cured by being irradiated with a total 5.5 W/cm$^2$ of UV, thereby preparing an acrylic foam layer having a thickness of 125 μm and a density of 0.28 g/cm$^3$.

The acrylic foam layer prepared as described above was stacked on one surface of a transparent polyethylene terephthalate (PET) film having a thickness of 25 μm.

Furthermore, a first adhesive layer formed of an acrylic adhesive layer was formed to have a thickness of 10 μm on the acrylic foam layer, and a second adhesive layer formed of an acrylic adhesive agent was formed to have a thickness of 10 μm on the other surface of the substrate film, thereby preparing a polymer foam adhesive tape.

Comparative Example 1

In order to form a urethane-based foam layer, a mixture was prepared by mixing 28 parts by weight of a curing agent, 2 parts by weight of a pigment, 10 parts by weight of a filler, 2 parts by weight of a surfactant, and 0.05 part by weight of a catalyst for a curing reaction with 100 parts by weight of a polyol mixture (9 wt % of a polyether-based monomer having a weight average molecular weight of 4,000, 17 wt % of a polyether-based monomer having a weight average molecular weight of 2,000, 32 wt % of a polyester-based monomer having a weight average molecular weight of 2,000, 32 wt % of a polyester-based monomer having a weight average molecular weight of 1,000, and 10 wt % of a chain extender), the resulting mixture was stirred by using a rotor-stator type mixer, so that pores were formed, and then a urethane-based foam layer having a thickness of 125 μm and a density of 0.24 g/cm$^3$ was prepared by a curing process by means of heat.

A transparent PET film having a thickness of 25 μm was used as a substrate film, and the urethane-based foam layer prepared as described above was stacked on one surface of the substrate film.

Furthermore, a first adhesive layer formed of an acrylic adhesive layer was formed to have a thickness of 10 μm on the urethane-based foam layer, and a second adhesive layer formed of an acrylic adhesive agent was formed to have a thickness of 10 μm on the other surface of the substrate film, thereby preparing a polymer foam adhesive tape.

Comparative Example 2

An acrylic composition including 98 wt % of ethylhexyl acrylate and 2 wt % of acrylic acid was prepared, 0.1 part by weight of a photoinitiator (Irgacure 651, BASF), 1.5 parts by weight of a curing agent (SUO-1020, Shin-a T&C), and 2 parts by weight of a surfactant were mixed with 100 parts by weight of the acrylic composition, and then a gas was mixed with the resulting mixture by using a rotor-stator type mixer. Furthermore, the prepared acrylic composition was cured by being irradiated with a total 5.5 W/cm$^2$ of UV, thereby preparing an acrylic foam layer having a thickness of 125 μm and a density of 0.28 g/cm$^3$.

The acrylic foam layer prepared as described above was stacked on one surface of a transparent polyethylene terephthalate (PET) film having a thickness of 25 μm.

Furthermore, a first adhesive layer formed of an acrylic adhesive layer was formed to have a thickness of 10 μm on the acrylic foam layer, and a second adhesive layer formed of an acrylic adhesive agent was formed to have a thickness of 10 μm on the other surface of the substrate film, thereby preparing a polymer foam adhesive tape.

Comparative Example 3

In order to form a rubber-based foam layer, a composition of a synthetic rubber dispersion (NBR, LG Chem.) having a solid content of 30% was prepared, 2 parts by weight of a surfactant was mixed with 100 parts by weight of the NBR composition, and then a gas was mixed with the resulting mixture by using a rotor-stator type mixer. A rubber-based foam layer having a thickness of 125 μm was prepared by drying the composition prepared as described above at 85° C. for 2.5 minutes and at 150° C. for 2.5 minutes.

The rubber-based foam layer prepared as described above was stacked on one surface of a transparent polyethylene terephthalate (PET) film having a thickness of 25 μm.

Furthermore, a first adhesive layer formed of an acrylic adhesive layer was formed to have a thickness of 10 μm on the rubber-based foam layer, and a second adhesive layer formed of an acrylic adhesive agent was formed to have a thickness of 10 μm on the other surface of the substrate film, thereby preparing a polymer foam adhesive tape.

Evaluation Method

Both surfaces of each of the polymer foam adhesive tapes prepared in Examples 1 to 4 and Comparative Examples 1 to 3 were attached onto a glass substrate, and the glass substrate was compressed under the conditions of 50° C. and 5 bars for 20 minutes in order to remove the incorporated air layer, and then was left to stand at room temperature for 2 hours. Thereafter, the thickness before compression was measured by a thickness gauge.

Furthermore, a flat tip having a diameter of 10 mm was connected to a measuring apparatus, and then a minimum compression load, a compression displacement, and a maximum compression rate were measured while applying a load from 10 g to 1 kg to the polymer foam adhesive tape attached onto the glass substrate. Furthermore, a speed at which the tip compressed the polymer foam adhesive tape to 1 kg, which is the maximum load, was set to 10 mm/min, the tip compressed the polymer foam adhesive tape to 1 kg which is the maximum load, the load was maintained for 30 seconds, and then the recovery speed was measured by setting the tip so that the tip rose up at a speed of 10 mm/min. After the tip was removed, the thickness recovery rate and the final compression recovery rate were measured by measuring the thickness by means of a thickness gauge.

Further, as described above, a required quantity of measurement samples with a size of 50 mm×25 mm were collected, and the dielectric constant was measured by using Agilent E4980A which is an apparatus for measuring the dielectric constant, and furthermore, the intensity and tendency of a signal of the adhesive tape were measured by using a sensor module while repeating a process which is the same as the process of measuring the compression rate.

The evaluation results for the polymer foam adhesive tapes prepared in Examples 1 to 4 and Comparative Examples 1 to 3 are summarized in the following Table 1.

TABLE 1

| | Example 1 | Example 2 | Example 3 | Example 4 | Comparative Example 1 | Comparative Example 2 | Comparative Example 3 |
|---|---|---|---|---|---|---|---|
| Dielectric constant (@10$^5$ Hz) | 3.0 | 3.8 | 2.8 | 3.3 | 2.0 | 1.8 | 6.0 |
| Minimum compression load (g) | 100 | 50 | 50 | 30 | 100 | 30 | 200 |
| Intensity of signal at 100 g | 280 | 1,000 | 250 | 500 | Cannot be measured | Cannot be measured | More than 10,000 |
| Intensity of signal at 500 g | 1,500 | 4,500 | 1,100 | 1,900 | 150 | Cannot be measured | More than 10,000 |
| Intensity of signal at 1 kg | 3,200 | 8,000 | 2,500 | 4,000 | 500 | Less than 200 | More than 10,000 |

As shown in Table 1, it may be confirmed that when the dielectric constant of the polymer foam adhesive tape is between 2.5 and 4.5, a signal value according to each pressure load is properly exhibited. It could be confirmed that as the dielectric constant was increased, the signal value became intensified, and that the signal value also exhibited linearity according to the compression load in all the Examples.

In Table 1, the intensity of the signal means a relative intensity of a signal according to a load applied when a state in which a load is not applied is defined as 1.

According to Comparative Examples 1 and 2, when the dielectric constant of the polymer foam adhesive tape was 2.5 or less, the signal value was too low, or could not be measured at a compression load of 500 g or less. In contrast, when the dielectric constant is extremely high as in Comparative Example 3, the signal value was very strong at the entire compression loads, but it could be confirmed that there were problems in that it was difficult to distinguish the difference among signal values according to the compression load, and the noise was significant.

The polymer foam adhesive tape prepared in Example 1 exhibited a compression displacement of 10 μm to 70 μm and exhibited an intensity of a signal of 1,077 at the maximum compression rate, and as can be seen from the result in Table 1, it could be confirmed that the tendency of the change in signal according to the compression rate exhibited linearity.

In contrast, the polymer foam adhesive tape according to Comparative Example 1 exhibited a compression displacement of 10 μm to 70 μm and exhibited an intensity of a signal of 70.6 at the maximum compression rate, and as can be seen from Table 1, it could be confirmed that the polymer foam adhesive tape exhibited a significant intensity of a signal only at a compression load of more than 100 g.

Furthermore, the polymer foam adhesive tape prepared in Comparative Example 2 exhibited a compression displacement of 10 μm to 70 μm and exhibited an intensity of a signal of 2,120 at the maximum compression rate, and as can be seen from Table 1, the polymer foam adhesive tape exhibited an electrostatic capacitance signal including severe noise over the entire compression rate range and thus had a problem in that the polymer foam adhesive tape is applied to a product.

EXPLANATION OF REFERENCE NUMERALS AND SYMBOLS

100: Substrate film
200: Polymer foam layer
300: First adhesive layer
400: Second adhesive layer

The invention claimed is:

1. A touch panel comprising:

a polymer foam adhesive tape including:

- a substrate film;
- a polymer foam layer provided on one surface of the substrate film;
- a first adhesive layer provided on the polymer foam layer; and
- a second adhesive layer provided on the other surface of the substrate film, wherein the polymer foam adhesive tape is attached to a lower surface of a display part of the touch panel and has a dielectric constant of 2.5 to 4.5 at a frequency of $10^5$ Hz, a compression recovery rate of 90% or more, and a compression recovery time to reach 90% of the thickness before compression is within 0.1 second.

2. The touch panel of claim 1, wherein the substrate film has a thickness of 10 μm to 250 μm.

3. The touch panel of claim 1, wherein the polymer foam layer has a thickness of 75 μm to 1,000 μm.

4. The touch panel of claim 1, wherein the substrate film and the polymer foam layer have a total thickness of 100 μm to 1,000 μm.

5. The touch panel of claim 1, wherein the polymer foam adhesive tape has a maximum compression rate of 30% to 70%.

6. The touch panel of claim 1, wherein the polymer foam adhesive tape has a final compression recovery rate of 99% or more, and a compression recovery time to reach 99% of the thickness before compression is within 1.0 second.

7. The touch panel of claim 1, wherein the polymer foam adhesive tape has a minimum compression load of 30 g to 300 g.

8. The touch panel of claim 1, wherein a thickness ratio of the substrate film to the polymer foam layer is from 1:3 to 1:10.

9. The touch panel of claim 1, wherein a total thickness of the substrate film and the polymer foam layer is from 100 μm to 150 μm, and a thickness ratio of the substrate film to the polymer foam layer is from 1:3 to 1:10.

10. The touch panel of claim 9, wherein the thickness ratio is from 1:4 to 1:6.

11. The touch panel of claim 1, wherein a total thickness of the substrate film and the polymer foam layer is from 150 μm to 1,000 μm, and a thickness ratio of the substrate film to the polymer foam layer is from 1:4 to 1:10.

12. The touch panel of claim 11, wherein the thickness ratio is from 1:7 to 1:10.

13. The touch panel of claim 1, wherein the polymer foam layer is urethane-based foam layer, a silicone-based foam layer, an acrylic foam layer or a polyolefin-based foam layer.

14. The touch panel of claim 1, wherein the polymer foam layer has a density of 0.3 g/cm$^3$ or less.

15. The touch panel of claim 14, wherein the density is from 0.15 g/cm$^3$ to 0.3 g/cm$^3$.

16. The touch panel of claim 1, wherein the substrate film is a polymer film prepared from a material selected from the group consisting of polypropylene, polyethylene, polyvinyl chloride, polyethylene terephthalate, polyethylene naphthalate, polycarbonate, polymethyl(meth)acrylate (PMMA), cellulose acetate, cellulose triacetate, and ethyl cellulose.

17. The touch panel of claim 1, wherein the first adhesive layer and the second adhesive layer is each independently prepared by curing an adhesive agent, wherein the adhesive agent includes at least one resin of an acrylic polymer, a silicone-based polymer, or a rubber-based polymer.

* * * * *